United States Patent [19]

Tustison et al.

[11] Patent Number: 4,995,684
[45] Date of Patent: Feb. 26, 1991

[54] IMPACT RESISTANT AND TEMPERED OPTICAL ELEMENTS

[75] Inventors: Randal W. Tustison, Lexington; Dennis Montanari, West Townsend; Thomas Varitimos, Norwood; Bernard diBenedetto, Wayland, all of Mass.

[73] Assignee: Raytheon Company, Lexington, Mass.

[21] Appl. No.: 342,605

[22] Filed: Apr. 20, 1989

Related U.S. Application Data

[63] Continuation of Ser. No. 875,893, Jun. 18, 1986, abandoned.

[51] Int. Cl.⁵ .......................... G02B 1/10; G02B 5/28; G32B 18/00; G32B 33/00
[52] U.S. Cl. ...................................... 350/1.6; 350/1.1; 350/164; 428/908.8
[58] Field of Search ........................ 65/61; 428/908.8; 350/1.6, 164, 166, 1.1; 427/163

[56] References Cited

U.S. PATENT DOCUMENTS

| | | | |
|---|---|---|---|
| 2,758,510 | 8/1956 | Auwärter | 350/1.6 X |
| 3,432,225 | 3/1969 | Rock | 350/164 |
| 3,573,023 | 3/1971 | Thomas et al. | 65/61 |
| 4,171,400 | 10/1979 | Rosette et al. | 350/1.1 X |
| 4,461,750 | 7/1984 | Chess et al. | |
| 4,476,156 | 10/1984 | Brinker et al. | |
| 4,498,728 | 2/1985 | Thöni et al. | 350/1.7 |
| 4,619,792 | 10/1986 | Saunders et al. | 350/1.1 X |
| 4,907,846 | 3/1990 | Tustison et al. | 350/1.6 |

FOREIGN PATENT DOCUMENTS

| | | |
|---|---|---|
| 0049032A1 | 4/1982 | European Pat. Off. |
| 292125 | 10/1953 | Switzerland ............... 350/164 |
| 2105371B | 10/1985 | United Kingdom |
| 2165266A | 4/1986 | United Kingdom |

OTHER PUBLICATIONS

Bar and Stroud Specification Sheet No. AR25, "Advance Technical Data: Abrasion Proof High Temperature Operation", (date unknown).

J. E. Field et al; "Liquid Impact Damage Assessment for a Range of Infra-Red Materials"; *Proc. 6th Int. Conf. on Erosion by Liquid and Solid Impact;* Sep. 1983; pp. 21-1 to 21-13.

B. Hodgson, et al., a reprint from the Proceedings, "Diamond Turning of IR Components", SPIE, vol. 590, Infrared Technology and Applications (1985), pp. 71-76.

(List continued on next page.)

*Primary Examiner*—Bruce Y. Arnold
*Assistant Examiner*—David R. Parsons
*Attorney, Agent, or Firm*—Denis G. Maloney; Richard M. Sharkansky

[57] ABSTRACT

An impact resistant anti-reflection coating for an optical element mounted on an airborne system which mitigates damage to the optical element when the airborne system is flown through a high velocity droplet impact medium is described. In a first embodiment, the coating comprises a material having a relatively high modulus of elasticity deposited to a thickness equal to an odd multiple of a quarter of a wavelength of the wavelength radiation to be transmitted through the optical element. In accordance with a further aspect of the invention, the high modulus of elasticity layer may comprise a homogeneous mixture of a pair of high modulus elasticity materials as well as a composite layer comprising a first layer of a high modulus elasticity material and a second layer of a second modulus of elasticity material. In a second embodiment, the outer surface of an infrared material is strengthened by single diamond point turning the outer surface of the material to introduce into the surface a compressive layer. The compressive layer is characterized as having a plurality of furrows or grooves being spaced by compressed regions of material and having disposed under said furrows or grooves a compressed region of material.

43 Claims, 11 Drawing Sheets

OTHER PUBLICATIONS

Table III. "Oxide Films for Optical Applications", Applied Optics, vol. 18, No. 12, Jun. 15, 1979, pp. 1972-1973.

S. Van Der Zwaag, et al., "The Effect of Double Layer Coatings of High Modulus on Contact Stresses", Philosophical Magazine A, 1986, vol. 53, No. 1, pp. 101-111.

Lussier, F., "Guide to IR-Transmissive Materials," Laser Focus, vol. 12, No. 12, Dec. 1976, pp. 47-50.

Dislich, H., et al, "Amorphous and Crystalline Dip Coatings Obtained from Organometallic Solutions: Procedures, Chemical Processes and Products," Thin Solid Films 77 (1981) 129-139.

Plasma Assisted Ion Plating Deposition of Optical Thin Films for Coatings and Integrated Optical Applications, M. Varasi, C. Mancini, P. Sartori, C. Misiano, Vacuum vol. 36, Nos. 1-3, pp. 143-147, 1986.

Compressive Thin Films for Increased Fracture Toughness, P. H. Kobrin & A. B. Harker, Rockwell International Science Center, pp. 5-9.

Impact Damage Thresholds in Brittle Materials Impacted by Water Drops, A. G. Evans, Y. M. Ito & M. Rosenblatt, 1980 American Institute of Physics, J. Appl. Phys. 51(5) May 1980.

Herstellung und Eigenschaften Von Schichten Aus $Y_2O_3$ und Oxiden der Seltenen Erden auf Glas*, B. Frank und R. Groth, Thin Solid Films, 3(1969) 41-50--Elsevier, Lausanne.

Antisolar and Thermally Insulating Thin Films for Simple Glazings/D. Gross, Elsevier Sequoia, Sep. 18-20 1980, Thin Solid Films 77 (1981) 128.

Oxide Coatings From the Sol-Gel Process/Lisa C. Klein, Rutgers University, Ceramics Dept. Box 909 Piscataway, N.J. 08854 pp. 378-385.

Liquid Jet Impact Damage on Zinc Sulphide, S. Van Der Zwaag, J. E. Field, Dept. of Metallurgy, Journal of Material Science 17 (1982 2525-2636.

Growth of Diamond at Room Temperature by an Ion-Beam Sputter Deposition Under Hydrogen-Ion Bombardment, Makoto Kitabatake & Kiyotaka Wasa, Central Research Laboratories, J. Appl. Phys. 58(4) Aug. 15, 1985.

Structure and Properties of Quasi-Amorphous Films Prepared by Ion Beam Techniques, C. Weissmantel, K. Bewilogua, D. Dietrich, H.-J. Erler, H-J. Hinneberg, S. Klose, W. Nowick, G. Reisse//Conference on Metallurgical Coatings (1980) 19-31.

S. van der Zwaag and J. E. Field, AFWAL-TR-8-2-4022.

J. E. Field, S. van der Zwaag, D. Townsend and J. P. Dear, AFWAL-TR-83-4101.

Single-point Diamond Machined

Conventionally Polished 0.3 mm

ZnS Surfaces
Conv. Polished
Diamond-Pt Machined
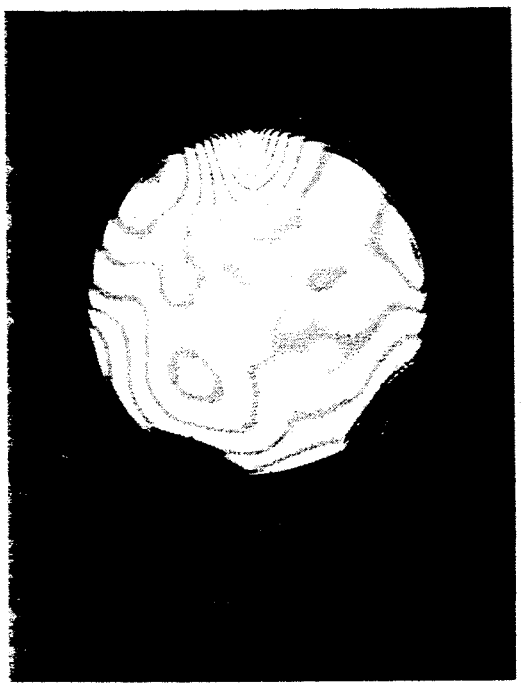
Irregular
Highly Concave
FIG. 18A
FIG. 18B

IMPACT RESISTANT AND TEMPERED OPTICAL ELEMENTS

This application is a continuation of application Ser. No. 875,893 filed June 18, 1986.

BACKGROUND OF THE INVENTION

This invention relates generally to optical elements and more particularly to impact protection and strengthening of optical elements.

As is known in the art, optical imaging systems generally include externally mounted optical elements which shield the remainder of the imaging system from an external environment. For example, with infrared (IR) airborne imaging systems, an IR transparent optical element such as a window or dome is mounted on the airborne system to isolate the remainder of the IR imaging system from exposure to humid, corrosive and abrasive environments. Prolonged exposure to these environments generally degrade the optical and physical characteristics of the material of the optical element. Generally, the most severe environmental exposure encountered by these external elements appears to be high velocity water droplet impact which occurs when an airborne system is flown through a rain field.

This problem of water droplet impact is more generally referred to in the art as rain erosion. During flight through a rain field, water droplets impinge upon the surface of the external element producing subsurface fractures even at subsonic velocities. For very brittle materials these subsurface fractures are initiated at pre-existent microflaws lying near the surface of the optical element. Rain erosion damage to such optical elements occurs prior to any significant removal of material. The mere propagation of these pre-existent microflaws is sufficient to damage the optical element. In particular, these microflaws are propagated through the optical element by the tensile component of the surface stresswave created at the time of impact with the water droplet. Once formed, the continued propagation of the subsurface fractures through the optical element will often produce large cracks in the optical element. In the region of the crack, scattering and refraction of incident IR energy occurs producing increased internal reflections and IR energy losses. With a significant number of such cracks, the transmissivity of the optical element is severely reduced. Furthermore, as cracks propagate through the optical element, catastrophic failure of the element may occur. When the optical element shatters or breaks, the remaining optical elements of the IR imaging system are exposed to the external environment, resulting in potential catastrophic damage to the imaging system.

Typically, materials which offer the best mechanical durability and optical performance for infrared imaging systems, particularly in the 8 $\mu$m to 12 $\mu$m infrared band, are limited to a relatively small number. Suitable materials include zinc sulfide, zinc selenide, germanium, gallium arsenide, gallium phosphide, mercury cadmium telluride and cadmium telluride. Ternary sulfide materials such as calcium lanthanum sulfide are also currently being developed for IR applications, particularly in the 8-12 $\mu$m band. These ternary sulfide materials may provide some improvement in durability but even these materials are susceptible to the environmental exposures mentioned above. Generally, all of the aforementioned materials are relatively brittle and have a relatively low resistance to damage, particularly damage sustained during high velocity water droplet impact.

It is also known in the art that optical energy incident upon a surface of an optical element will result in reflection of energy at such surface if the index of refraction of the material comprising the optical element is significantly different than the index of refraction of the medium from which the energy originates. Generally, for airborne systems, the originating medium is air having an index of refraction of about one. Accordingly, it is standard practice in the optical industry to provide coatings of material of appropriate refractive index over the incident surface of the optical element to reduce such reflection losses. At the deposited thicknesses, which are generally related to a fraction of an optical wavelength, these coatings are transparent in the IR band. However, heretofore such optical coatings have served only to reduce reflection losses caused by a mismatch in refractive indices and have not served to increase the impact resistance of the optical element.

It is known in the art that a layer of hard carbon, that is, a carbon layer having quasi-diamond bonds and substantial optical transparency, when provided over germanium provides limited protection to germanium optical elements from impact damage caused by rain erosion. Hard carbon coatings on germanium are described in an article entitled "Liquid Impact Erosion Mechanisms In Transparent Materials" by J.E. Fields et al, Final Report Sept. 30, 1982 to Mar. 31, 1983, Contract No. AFOSR-78-3705-D, Report No. AFWAL-TR-83-4101. The hard carbon surfaces have not successfully adhered to other IR materials such as zinc sulfide and zinc selenide. Furthermore, hard carbon coatings even on germanium as mentioned in the article are susceptible to debonding during high velocity water droplet impact. It was theorized there that the sheering force resulting from the radial outflow of water droplet impact causes debonding of the coating from the germanium layer. This phenomena of debonding is believed to significantly increase as the thickness of the hard carbon layer is increased. Therefore, thicker hard carbon coating layers which should have resulted in further impact protection for the optical element were not successful because of the aforementioned debonding problem. A further problem with hard carbon is that the index of refraction of hard carbon is about 2.45, substantially higher than the index refraction of many of the aforementioned optical materials such as zinc sulfide and zinc selenide. Accordingly, if an optical element is coated with a hard carbon coating, reflection losses at the incident surface of the optical element will be higher than if the optical element was not coated.

A third problem in the art concerns the fracture strength of these materials. Again, most materials which are suitable for IR transparent windows particularly in the 8 $\mu$m to 12 $\mu$m band have low fracture strengths. This characteristic is particularly important in applications of these elements where the element separates a high pressure region from a low pressure region, that is, in applications where the element is under some static or dynamic mechanical load. In an article entitled "Impact Damage Threshold In Brittle Materials Impacted By Water Drops" by A.G. Evans et al, Journal of Applied Physics 51 (5), pps. 2473-2482 (May, 1980) at page 2481 it was theorized that martensite toughening (phase changes) at the surface of the brittle material may be useful in tempering such brittle materials. It was also theorized that surface compression stresses could be of benefit. However, the authors gave no specific description what they meant by "surface compression." These brittle materials undergo surface compression when incident water drops impact the surface of the material.

SUMMARY OF THE INVENTION

In accordance with the present invention, an optical element which is resistant to high velocity water droplet impact includes a base layer of a first material having a first predetermined modulus of elasticity and a coating of a second material having a second, higher modulus of elasticity. The coating layer bonds to the material of the optical element and has a high degree of resistance to debonding caused by sheer stresses encountered during high velocity water droplet impact. Preferably, the high modulus of elasticity coating comprises a material having an index of refraction less than the index of refraction of the material comprising the optical element. Preferably still, the material is substantially transparent to infrared radiation, and is substantially water insoluble. With this arrangement, the coating of the second higher elastic modulus material protects the base comprised of the lower elasticity modulus material against impact damage, particularly such impact damage caused by high velocity droplet impact. Furthermore, the coating material having a high resistance to debonding from sheering forces will remain intact on the optical element during high velocity water droplet impact and thereby protect the optical element from environmental exposures such as rain erosion.

In accordance with a further aspect of the present invention, the coating comprises a composite coating of a mixture, preferably homogeneous mixtures of first and second materials, each having a modulus of elasticity at least twice as high as the modulus of elasticity of the material forming the base layer. The second material has a substantially higher modulus of elasticity than the first material, whereas the first material is insoluble and inert with water and the second material is reactive with water. With this arrangement, the composite coating provides a layer over the optical element having a higher modulus of elasticity than the modulus of elasticity which would be provided by just a layer of the first material. However, the composite coating will also have a relatively low water solubility and reactivity with water particularly if a layer of the first material is provided to isolate the mixture from a source of water.

In accordance with further aspect of the present invention, the material of the base layer is selected from the group consisting of silicon, germanium, gallium arsenide, gallium phosphide, cadmium telluride, mercury cadmium telluride, zinc sulfide and zinc selenide, and more preferably, cadmium telluride zinc sulfide, zinc selenide or a ternary sulfide such as calcium lanthanum sulfide. The high modulus infrared transparent material comprising the first coating layer is selected from the group consisting of yttrium oxide, scandium oxide, and a homogeneous composition of yttrium oxide and magnesium oxide, a composition of scandium oxide and magnesium oxide, and a composition of scandium oxide and yttrium oxide. With such arrangements, an impact resistant anti-reflection coating for optical elements operative in the 8 $\mu$m to 12 $\mu$m wavelength band is provided making such elements more resistant to damage caused by rain erosion or high velocity water droplet impact.

In accordance with a still further aspect of the present invention, an optically transparent element, comprising a first infrared transparent material having a first modulus of elasticity, is protected from high velocity water droplet impact by a composite coating comprising a first layer of a second, optically transparent material having a second, substantially higher modulus of elasticity than that of the material of the optical element, and an index of refraction less than the index of refraction of the material of the optical element. The first coating layer material is substantially resistant to debonding from the material of the optical element in response to sheer stresses resulting from radial outflow of droplets during high velocity droplet impact. A second layer of the composite coating comprises a third material having a third relatively high modulus of elasticity, said modulus of elasticity being higher than the modulus of elasticity of the first material comprising the optical element layer and, preferably higher than the second material of the first coating layer. The third material comprising the second coating layer is substantially transparent to infrared radiation and has an index of refraction higher than the index of refraction of the second material of the first coating layer. The third material comprising the second coating layer is also substantially resistant to debonding from the second material of the first layer of the composite coating, but may have a relatively poor resistance to debonding to the first material of the optical element. With such an arrangement, by interposing the first layer of material having substantial resistance to radial outflow induced debonding from the material of the optical element and further having substantial resistance to radial outflow induced debonding of the third material of the second coating layer, a composite coating is provided which is substantially resistant to radial outflow induced debonding and further has a modulus of elasticity greater than that of the first material. The composite coating allows the effective physical thickness of the protective coating to increase, affording increased protection while still maintaining or possibly improving the optical properties of the combination of the composite coating layer and the optical element.

In accordance with a further aspect of the present invention, the first material of the optical element is selected from the group consisting of silicon, germanium, gallium arsenide, gallium phosphide, mercury cadmium telluride, cadmium telluride, zinc sulfide and zinc selenide or a ternary sulfide. Preferably, the material is selected from the group consisting of cadmium telluride, zinc sulfide and zinc selenide. The second material of the first coating layer is selected from the group consisting of yttrium oxide, scandium oxide or mixtures of yttrium oxide or scandium oxide with magnesium oxide. The third material of the second coating layer is selected from the group consisting of cerium oxide, titanium oxide, zirconium oxide or hard carbon. With such an arrangement, by interposing the second material comprising the first coating layer which bonds well to both the first material of the optical element and to the third material of second coating layer, in particular, the hard carbon layer, the adherence problems generally associated with hard carbon to most 8–12 $\mu$m optical materials, are eliminated. Further, since materials such as hard carbon do not have the proper refractive index to antireflect materials such as zinc sulfide, zinc selenide or cadmium telluride, the hard carbon layer can be used in combination with the lower index of refraction first coating layer to provide an effectively lower index of refraction composite layer.

In accordance with a still further aspect of the present invention, an optical element is protected by a composite layer comprising a plurality of layers of a low index, high modulus of elasticity material followed by a high index, high modulus of elasticity material stacked in an iterative fashion to form a multi-layer, anti-reflective impact resistant coating. With such an arrangement, this coating could be designed to provide broadband anti-reflection characteristics or other optical functions such as filtering with the advantage that the total physical thickness of the composite multi-layer coating could be large providing increased impact resistance. Preferably, the low index, high modulus of elasticity material is selected from the group consisting of yttrium oxide, scandium oxide or mixtures of yttrium oxide or scandium oxide with magnesium oxide and the high index, high modulus of elasticity material is selected from the group consisting of cerium oxide, titanium oxide, zirconium oxide or hard carbon. The material comprising the optical element is selected from the group consisting of silicon, germanium, gallium arsenide, gallium phosphide, cadmium telluride, mercury cadmium telluride, zinc sulfide and zinc selenide or a ternary sulfide.

In accordance with a still further aspect of the present invention, an impact resistant, tempered optical element includes a base layer of an optical material having an initial fracture strength. Disposed over the base layer of optical material is a coating comprising a compressed layer of material. The compressed layer of material has an overall thickness which is substantially smaller in comparison to the thickness of the base of the optical material. With such an arrangement, the compressed layer of material will tend to mitigate the effects of the tensile stress wave component encountered during droplet impact on surface microflaws, preventing their propagation through the surface of the optical element. The compressed regions, however, will tend to close these microflaws preventing their propagation in response to the tensile stress wave component thereby reducing or compensating for the tensile stress wave component. By reducing this tensile stress component, the damage resulting from water droplet impact on a surface of the optical element will be mitigated and hence the relatively brittle material is provided with a tempered surface which is resistant to damage caused by rain erosion. This tempered surface concomitantly increases the fracture strength of the optical element.

In accordance with a further aspect of the present invention an optical element, tempered to resist damage encountered during high velocity impact, includes a base comprising an optical material having disposed on a surface thereof a compressed layer of said material. The compressed layer of material comprises a plurality of furrows disposed in said layer, said furrows being separated by adjacent regions of said compressed layer and having disposed under said furrows a portion of the compressed layer of material.

Preferably, the thickness of the compressed region of the optical material is 3 microns or less. The furrows are typically 10Å to 10,000Å deep and 0.01 to 0.02 mm wide. With this arrangement, a tempered optical element is provided which is highly resistant to damage encountered during high velocity projectile impact.

In accordance with a still further aspect of the present invention, a method of tempering an optical element comprises the steps of machining a plurality of furrows into the optical element, said furrows having a depth generally in the range of 10Å to 10,000Å providing between adjacent furrows and under said furrows a compressed region of the optical material.

In accordance with a still further aspect of the present invention, a method of tempering a surface of an optical material includes the step of single-point machining of the optical element to provide a compressed layer 0.5 $\mu$m to 3.0 $\mu$m thick into the surface of the optical element. The compressed layer includes a plurality of furrows having a depth between 10 to 10,000 Å with adjacent furrows being spaced by a portion of the compressed layer of the material of the optical element. Preferably, the furrows are introduced into the optical material by rotating the optical element at a predetermined speed while a single-point diamond tool is brought into contact with the surface of the rotating optical element, with said tool being fed across the surface of the optical element at a predetermined rate until the aforementioned compressed layer is provided. With this arrangement, by single-point machining the surface of the optical element, a compressed layer of the material of the optical element is provided. This compressed layer will strengthen the optical element and aid in preventing damage to the optical element resulting from high velocity droplet impact by mitigating or reducing the near-surface tensile forces resulting during high velocity water droplet impact.

In accordance with a still further aspect of the present invention, an impact resistant, tempered optical element includes a base layer of an optical material having initial fracture strength and having a first predetermined modulus of elasticity. Disposed over the base material layer is a compressed layer of optical material. The compressed layer of material has an overall thickness which is substantially small in comparison to the thickness of the base of the optical material generally in the range of 1-3 microns. Disposed over the compressed layer is a coating layer of a second material having a second, higher modulus of elasticity than that of the material forming the base layer of the optical element. The coating layer bonds to the compressed layer of optical material and has a high degree of resistance to debonding caused by sheer stresses encountered during high velocity water droplet impact. With this arrangement, the combination of the compressed layer and the coating layer provide an optical element having enhanced impact resistance and strength characteristics. The outer coating layer provides a coating of a material having a second, higher modulus of elasticity thereby protecting the underlying base layer comprised of the lower elasticity modulus material against impact damage such as encountered by high velocity droplet impact. Moreover, the compressed layer of material will tend to mitigate the effects of this tensile stress wave component encountered during droplet impact. Therefore, the combination of the two techniques will provide an optical element having substantially improved impact resistance and fracture strength.

BRIEF DESCRIPTION OF THE DRAWINGS

The foregoing features of this invention, as well as the invention itself, may be more fully understood from the following detailed description of the drawings, in which:

FIGS. 18A, 18B are photomicrographs, respectively, of a lapped ZnS lens which was conventionally polished and a lapped ZnS lens which was tempered in accordance with the present invention showing distortion caused by the compressive layer.

DESCRIPTION OF THE PREFERRED EMBODIMENT

Figure 1:
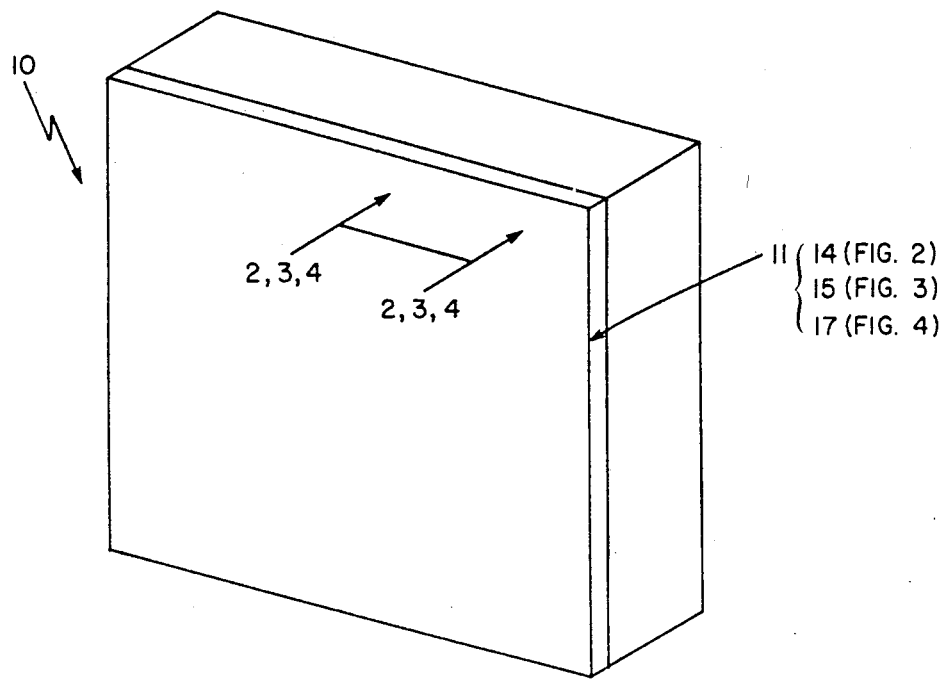
FIG. 1 is an isometric view of an optical element, here a plate comprising a base layer and a protective layer in accordance with the present invention.

Referring now to FIG. 1, an optical element here a plate 10 is shown to include a base layer 12 comprising a material having predetermined optical properties Although the optical element is herein described in particular as being a plate, it is understood that other types of optical elements such as windows, domes, lenses, etc having shapes other than planar may alternatively be substituted for the aforementioned plate 10. Typically base layer 12 will have a thickness of at least 0.05 in generally 0.1 in to about 0.5 in. or thicker. The optical element further may have selective optical properties For example, the optical element may be comprised of a material which is transparent to optical energy generally in the infrared, visible, and/or ultraviolet spectrums The material may be a dielectric or a semiconductor material. In particular, for optical elements used in infrared imaging systems in the 8 μm to 12 μm wavelength range, examples of preferred materials include silicon, germanium, gallium arsenide, gallium phosphide, mercury cadmium telluride, cadmium telluride, zinc sulfide, zinc selenide, or one of the ternary sulfides The selected material comprising layer 12 may be fabricated by any known technique such as powder compaction and densification or chemical vapor deposition In particular for infrared applications, the materials selected for layer 12 are generally characterized as having a relatively low modulus of elasticity typically in the range of $5 \times 10^6$ psi to $15 \times 10^6$ psi, a high transmittance to infrared energy, typically in a range of 50% to 75% over at least a portion of the infrared wavelength band of 2.0 μm to 30 μm, and an index of refraction at 10 microns typically in the range of 2.2 to 4.0. The relevant mechanical and optical properties of some of these materials are shown in Table 1.

TABLE 1

Properties of Materials for Base Layer 12

| Material | n @ 10 μm | R % | Thermal Expansion Coefficient ($10^{-6}$/°C.) | Elasicity Modulus of $\times (10^6$ psi) |
| --- | --- | --- | --- | --- |
| CdTe | 2.6 | 0.01 | 5.9 | 5.0 |
| ZnSe | 2.4 | 0.25 | 7.7 | 9.7 |
| ZnS | 2.2 | 0.89 | 7.4 | 10.8 |
| CaLa$_2$S$_4$ | 2.4 | 0.25 | 14.7 | 13.8 |
| GaP | 3.0 | 0.37 | 5.3 | 20.6 |
| GaAs | 3.3 | 1.17 | 5.7 | 15.5 |
| Ge | 4.0 | 4.10 | 6.1 | 15.0 |

R% is the reflection loss per surface resulting from a single quarter wavelength AR coating of $Y_2O_3$ as will be described below, applied over the corresponding material. Disposed over base 12 is an impact resistant anti-reflection coating layer 11. Suffice it here to say that coating layer 11 may have any one of the structures now to be discussed.

Figure 2:
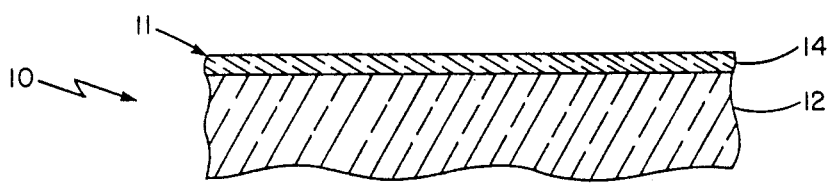
FIG. 2 is an exploded cross-sectional view taken along line 2—2 of FIG. 1 showing the protective layer comprising a single layer coating in accordance with one aspect of the present invention.

Referring now to FIG. 2, coating layer 11 is shown to include a first protective layer 14 disposed over and preferably on the material comprising base 12. Protective layer 14 is comprised of a material having a modulus of elasticity substantially higher than the modulus of the material of the base 12, a high degree of infrared transparency in the deposited thickness over the selected wavelength band of the optical element, and preferably an index of refraction less than the index of refraction of the material comprising base layer 12. Furthermore, the material deposited has a high degree of adherence to the material of layer 12 and in particular is highly resistant to debonding caused by sheer stresses induced by radial outflow of high velocity droplet impact such as water droplet impact. Layer 14 may be deposited by any technique such as ion beam sputtering, diode sputtering or evaporation. Furthermore, layer 14 may alternatively be provided over the plate 12 by dipping plate 12 in a solution comprising an organic vehicle and the high modulus of elasticity material. The plate after being dipped in the solution of such material is removed from this solution and placed in an oven where the organic vehicle is driven off. Alternatively, the coating may be deposited by spray drying a mixture of a vehicle and the coating material over the base layer 12 heated to a predetermined temperature. With these particular coating arrangements, a relatively inexpensive technique is provided to form a uniform layer of coating 14 on base 12. For the aforementioned base layer materials, suitable coating materials include yttrium oxide ($Y_2O_3$), magnesium oxide (MgO) and scandium oxide ($Sc_2O_3$), as well as, homogeneous mixtures of these aforementioned materials. The relevant mechanical and optical properties for these materials are shown in Table 2.

TABLE 2

Properties Of Materials For Layer 14

| Material | n @ (10μ) | Transmissivity range of 1.5 μm thick | Thermal Expansion Coefficient $10^{-6}/°C$ | ($10^6$ psi) Modulus of Elasticity | $H_2O$ Solubility |
|---|---|---|---|---|---|
| $Y_2O_3$ | 1.63 | 0.3–12μ | 7.2 | 25 | insol. |
| $Sc_2O_3$ | 1.70 | 0.3–12μ | 8.5 | 26 | insol. |
| MgO | 1.70 | 0.3–12μ | 12.0 | 48 | insol.-reacts with $H_2O$ |

The principal factors to be considered in selecting materials for coating layer 14 are that the selected material must have optical properties suitable for the intended use of the optical element 10 at the thicknesses at which the material of coating layers 14 is deposited. Further, the coating layer material 14 must have a modulus of elasticity generally about at least twice the modulus of elasticity of the material of base layer 12. Further, when the intended use of the optical element 10 will expose the coating layer 14 to water, the material of coating layer 14 must be insoluble and stable in water. In order to provide anti-reflection correction, the index of refraction of the material of coating layer 14 is preferably less than the index of refraction of the material of base 12. In general for anti-reflection correction between air having an index of about 1.00 and the material of base layer 12, the index of refraction required of the coating ($n_{14}$) is approximately equal to the geometric mean of the indices of refraction of the material of base layer 12 and the surrounding medium $$(n_{14} \approx \sqrt{n_{12}}).$$

As is known in general for most materials, the index or refraction varies as a function of wavelength dispersion. Accordingly, this anti-reflection correction also varies as a function of wavelength.

Preferably, layer 14 is deposited over the base layer 12 to a physical thickness corresponding to one-quarter of an optical wavelength at the particular wavelength of interest for the optical element. In general, the optical thickness ($t_o$) of such elements is defined as the product of the physical thickness (t) of the coating 14 and the refractive index ($n_c$) of the material of the coating 14 ($t_o = t \cdot n_c$). The desired physical thickness for an optical thickness of λ/4 is given by $t = (\lambda/4)/w_c$ where λ is the wavelength of particular interest for the optical element and $n_c$ is the refractive index of the coating at the wavelength of interest. As will now be appreciated by those skilled in the art, the optical thickness ($t_o$) may be a higher order thickness such as 3λ/4 or 5λ/4, and the physical thickness t is then generally given by $t = [(2N=1)\lambda/4]/n_c$ where N is an integer 0,1,2,3 .... Thus, the physical thickness t of layer 14 may be increased, offering greater impact resistance protection for base 12 while still maintaining good anti-reflection and optical transmissive properties. For a material such as $Y_2O_3$ having an index of refraction of $n_c = 1.63$ at 10.6 microns, the optimum thickness for a single λ/4 layer at 10.6 microns would be about 1.63 microns.

Figure 3:
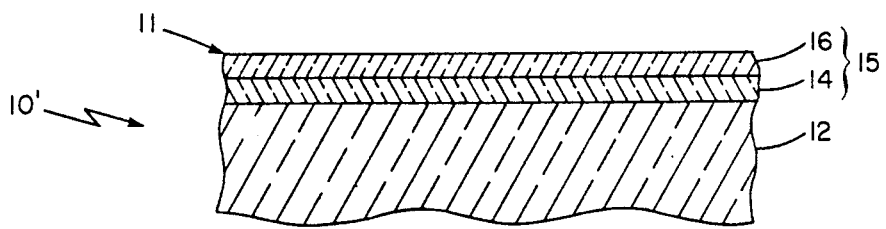
FIG. 3 is an exploded cross-sectional view taken along line 3—3 of FIG. 1 showing the layer comprising a pair of coating layers in accordance with an additional aspect of the present invention.

Referring now to FIG. 3, a plate 10 is shown to include the base 12 and coating layer 11 disposed over at least a first surface thereof. Coating layer 11 is here a composite, antireflective impact resistant layer 15. Layer 15 is shown to comprise the aforementioned coating layer 14 of the high elastic modulus material having an index of refraction less than the index of refraction of the material of the base 12, and having good adherence qualities to the material of the base layer 12. Disposed over this first coating layer 14 is a second coating layer 16 comprising a second material having a substantially higher elastic modulus and having an index of refraction higher than those of both the material of base 12 and first coating layer 14. Suitable materials for the aforementioned second coating layer 16 includes cerium oxide, titanium oxide, zirconium oxide and hard carbon. Of these examples, hard carbon is the preferred material since it has the highest modulus of elasticity. However, as mentioned previously, hard carbon does not adhere well to zinc selenide zinc sulfide etc. which are amongst the preferred materials for base layer 12, particularly at optical wavelengths in the range of 8 μm to 12 μm. The relevant mechanical and optical properties of these materials are shown in Table 3.

TABLE 3

Properties Of Materials For Layer 16

| Material | n @ (10 μm) | Thermal Expansion Coefficient $10^{-6}/°C$ | Modulus Of Elasticity $10^6$ psi | $H_2O$ Solubility |
|---|---|---|---|---|
| Hard carbon | 2.2–2.4 | — | 150 | insol. |
| CeO | 2.34 | 11.3 | 22 | insol. |
| $TiO_2$ | 2.4 | 8.2 | 44 | insol. |
| $ZrO_2$ | 2.1 | 7.2 | 28 | insol. |

Hard carbon films may be deposited by any suitable technique. For example, ion beam sputtering, as well as, chemical vapor deposition involving decomposition of hydrocarbon containing vapors may be used. Although hard carbon layers have not generally adhered well to most IR materials, as mentioned previously, it is believed that such hard carbon layers will adhere to materials suitable for use as first coating layer 14. As mentioned above, suitable materials for layer 14 include MgO, Sc$_2$O$_3$ and Y$_2$O$_3$. In general, hard carbon adheres very well to oxides of various types including the aforementioned ones. Thus, by interposing coating layer 14 between the very high modulus layer 16 and base 12, the impact resistant advantages of the very high modulus layer 16 materials provide an anti-reflection, highly impact resistant composite layer 15 to protect the base 12 from high velocity water droplet impact.

Figure 4:
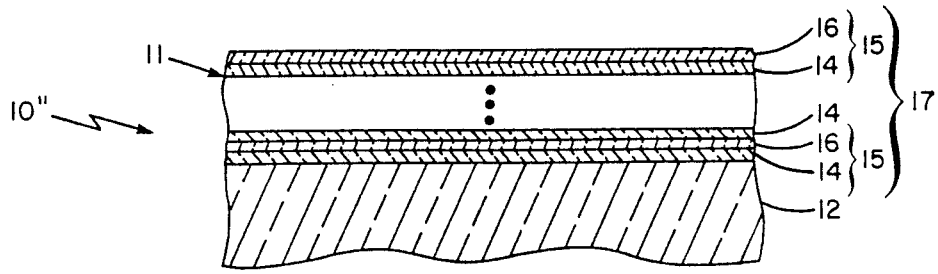
FIG. 4 is an exploded cross-sectional view taken along line 4—4 of FIG. 1 showing the layer comprising a plurality of pairs of alternating high index of refraction and low index of refraction coating layers in accordance with a still further aspect of the present invention.

Referring now to FIG. 4, an optical element here a plate is shown to include the base layer 12 and coating layer 11. Coating layer 11 here is a broadband anti-reflection impact resistant coating layer 17 having a plurality of the aforementioned composite, anti-reflective impact resistant coating layers 15, as described in conjunction with FIG. 3. With this arrangement, a very thick anti-reflective coating 11 having excellent adhesion properties to base 12 and high impact resistance is provided. Further, by appropriate selection of thicknesses of the plurality of composite layers 15 and the individual coating layers 14 and 16 in accordance with multilayer coating optical design principals, a broadband antireflection coating may also be provided.

Figure 5A:
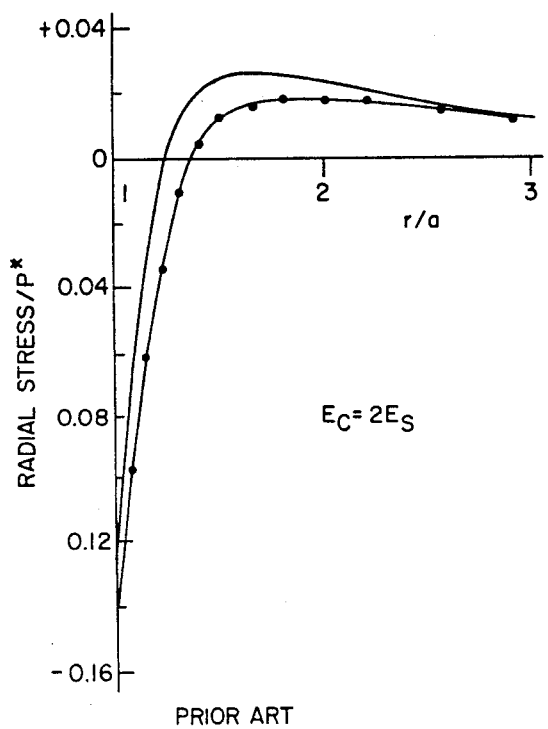
FIGS. 5A–5D are a series of graphs (prior art) showing radial stress reduction as a function of normalized distance from the center of droplet impact, for coatings having different modulii of elasticity.
Figure 5B:
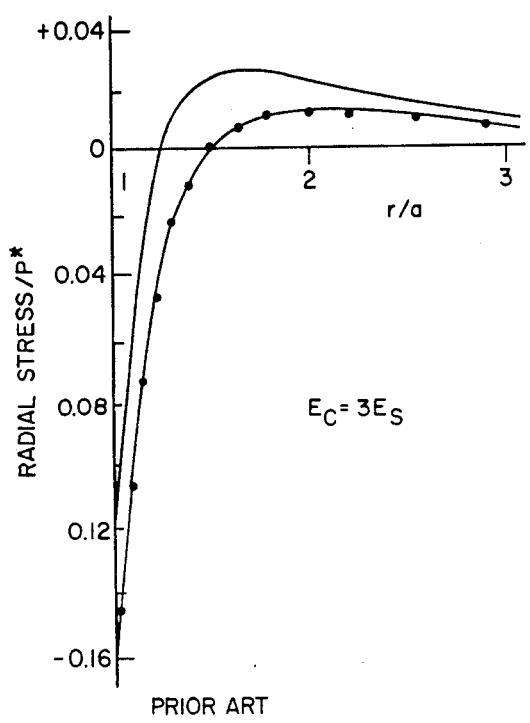
Figure 5C:
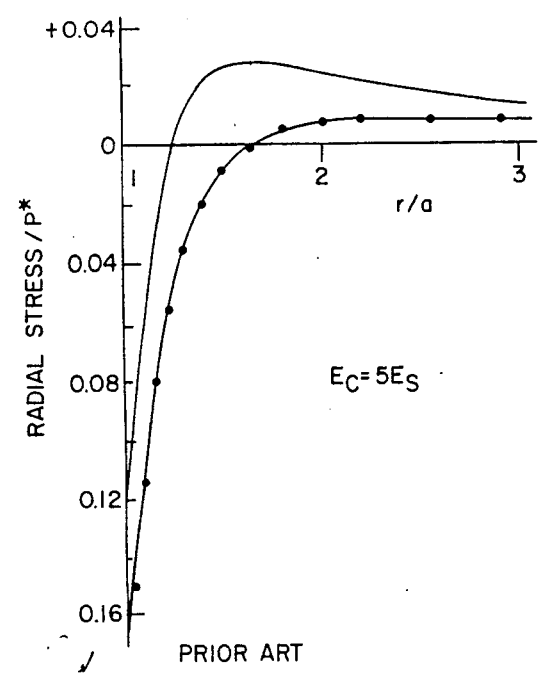
Figure 5D:
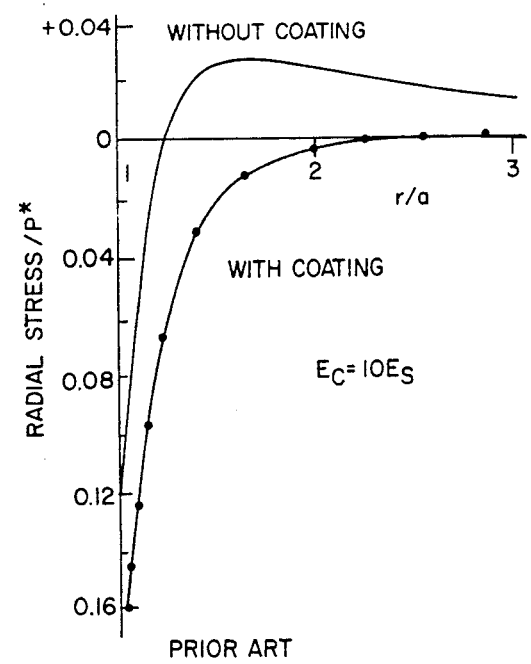

Referring now to FIGS. 5A-5D, a series of graphs from a Fields et al report entitled Liquid Impact Erosion Mechanisms In Transparent Materials AFWAL-TR-82-4022 shows radial stress reduction as a function of the normalized distance from the center of the drop impact. Each graph has plots representative of the radial stress developed on a coated surface having a modulus of elasticity higher than that of the material of the optical elements in comparison with the radial stress developed on an uncoated surface. As shown in FIG. 5D, when the modulus of elasticity of the material of the coating is approximately equal to 10 times the modulus of the material of the base layer, the tensile stresses induced in the base layer are substantially equal to zero during water droplet impact.

Figure 6:
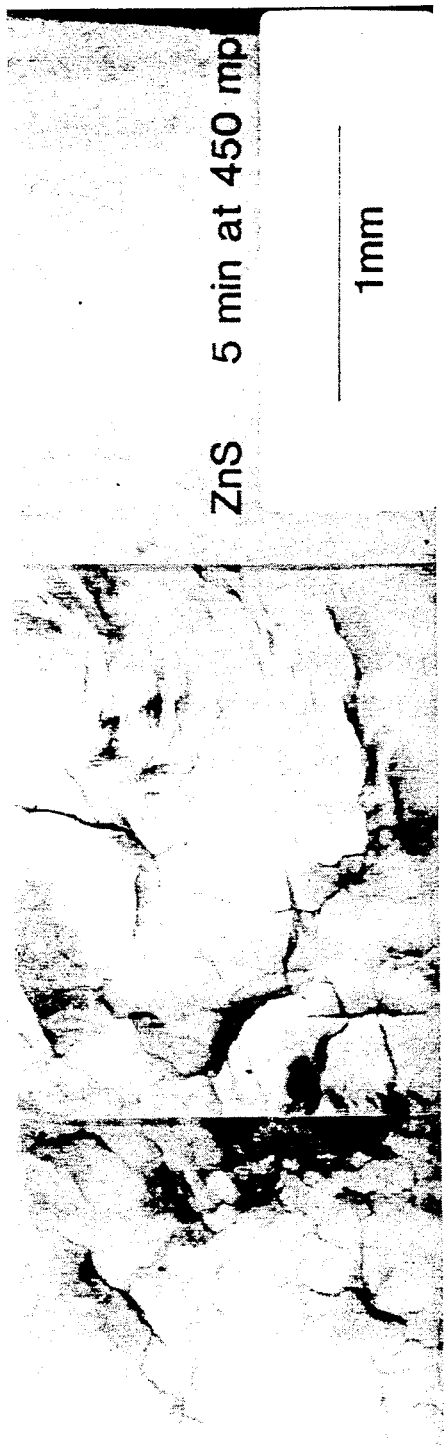
FIG. 6 is a photomicrograph of an uncoated ZnS surface exposed to a simulated rain field rate of 1 inch per hour, velocity of 450 mph, 90° impact angle and 2 mm rain drop size.
Figure 7:
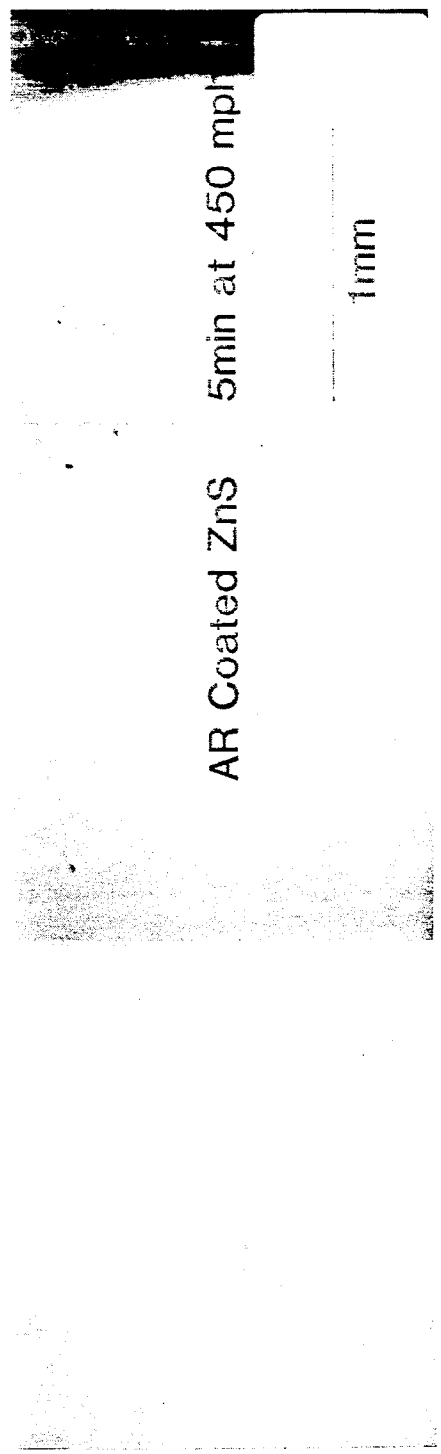
FIG. 7 is a photomicrograph of a coated surface in accordance with the present invention exposed to the same simulated rain field as described in FIG. 6.

Referring now to FIGS. 6 and 7, photomicrographs of an uncoated surface (FIG. 8) and a coated surface (FIG. 9) each after exposure to a simulated rain field at the rate of 1 inch per hour, at a velocity of 450 miles per hour, with an incident angle of 90° and droplet diameter of 2 mm is shown. As can be observed, the amount of damage exhibited by the uncoated surface of zinc sulfide is substantially higher than the damage exhibited by the yttrium oxide coated zinc sulfide surface.

Figure 8:
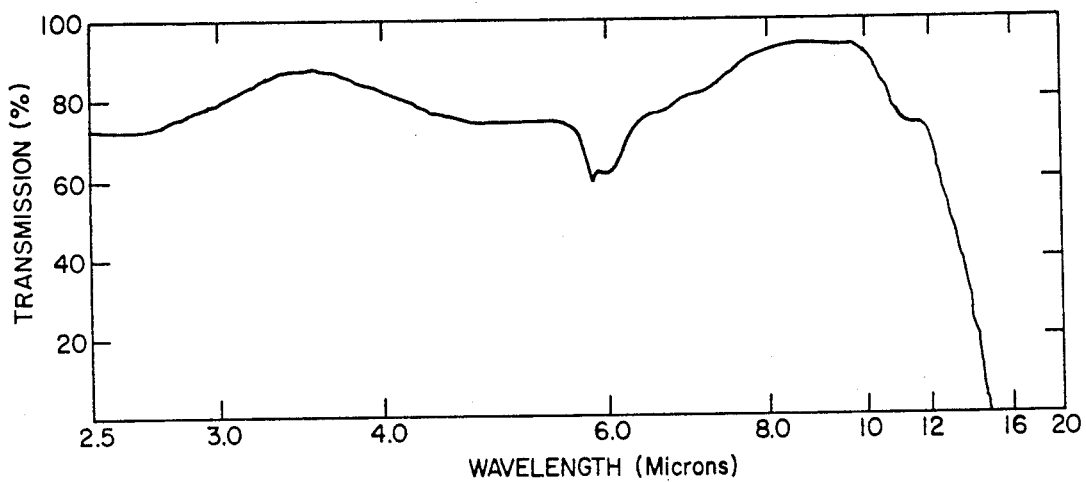
FIG. 8 is a plot of % transmissivity vs. wavelength for a 0.20 inch thick coated ZnS plate.
Figure 9:
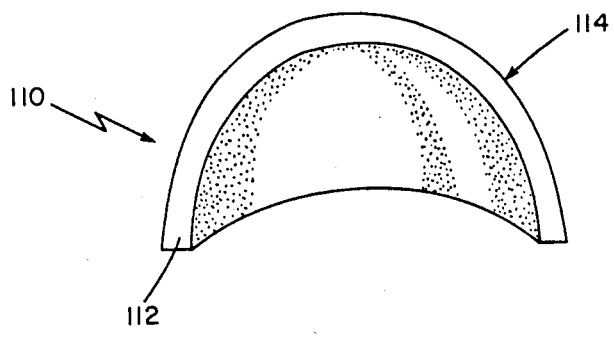
FIG. 9 is a cross-sectional view of a portion of a dome.

Referring to FIG. 8, a plot of a percent transmissivity vs. wavelength for a 0.2 inch thick coated plate of RAYTRAN (Trademark for Raytheon Co. Lexington, Ma.) type of zinc sulfide is shown. The coating was yttrium oxide a single quarter wavelength thick at 10.0 microns. The coating was approximately 2.45 microns thick. The coating was selected to maximize the transmittance of the surface at 10 microns, and was applied to both major surfaces of the plate.

Referring now to FIGS. 9-12, a portion of an optical element, here a dome 110, is shown to include a layer 112 comprising a material having predetermined optical properties. Although the optical element is herein described in particular as being a dome, it is understood that other types of optical elements such as windows, plates, lenses, etc. may alternatively be substituted for the aforementioned dome 110. Typically, base layer 112 will have a thickness as base layer 12. The optical element further may have selected optical properties. For example, the optical element may be comprised of a material which is transparent to optical energy generally in the infrared, visible, or ultraviolet spectrums. The material of the optical element may be a dielectric or a semiconductor material. In particular, for optical elements used for infrared imaging systems, examples of preferred materials include silicon, germanium, gallium arsenide, gallium phosphide, mercury cadmium telluride, cadmium telluride, zinc sulfide, zinc selenide or one of the ternary sulfides of the general form MN$_2$S$_4$ where M is a monovalent ion, N is a ion selected from the lanthanide series and S is the sulfide ion S$^{-2}$. The selected material comprising layer 112 may be fabricated by any known technique such as powder compaction and densification or chemical vapor deposition. In general, materials which are selected for layer 112 are characterized as having a relatively high transmittance to a particular energy, for example, infrared energy typically in excess of 50% at least over a portion of the infrared band, are generally very brittle and fairly stiff materials having a modulus of elasticity in the range of 5 to 15×10$^6$ psi, but are generally fairly weak materials having a fracture strength of typically 5,500 to 15,000 psi.

The dome 110 further includes a plastically deformed compressive layer 114 (FIG. 10) provided over surface 112a of the optical element 110. Preferably, the compressive layer 114 is a portion of the material of layer 112. As shown more particularly in FIG. 12, the compressive layer 114 includes a plurality of furrows or grooves 113 with adjacent ones of said grooves or furrows 113 being spaced by compressed regions 113a of the material of layer 112 and having disposed under said furrows a compressed layer 113b. The degree to which the layer 114 is compressed is a function of the magnitude of the compressive forces which are provided during treatment of the dome 110 as will be described.

Figure 11:
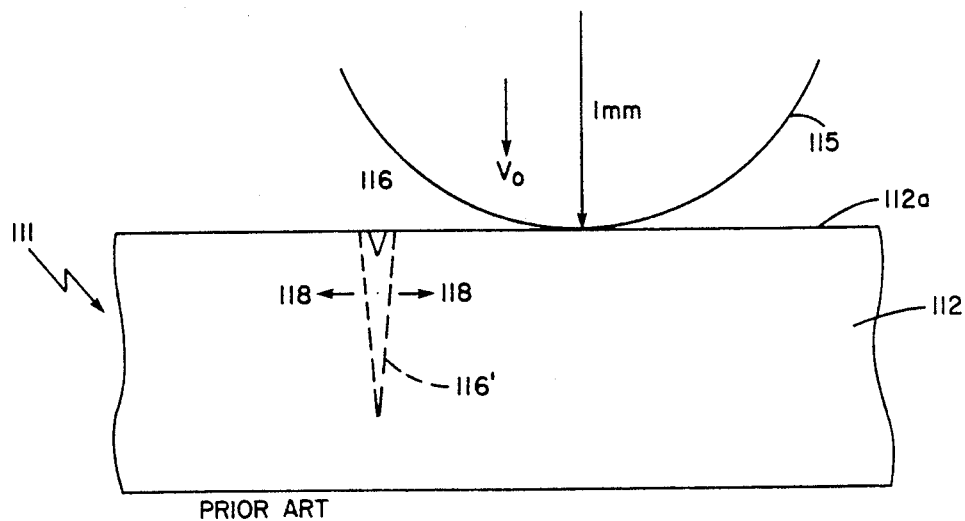
FIG. 11 is a diagrammatical view in cross section of a rain droplet incident upon a surface of a conventional optical element having a microstructure fault.
Figure 12:
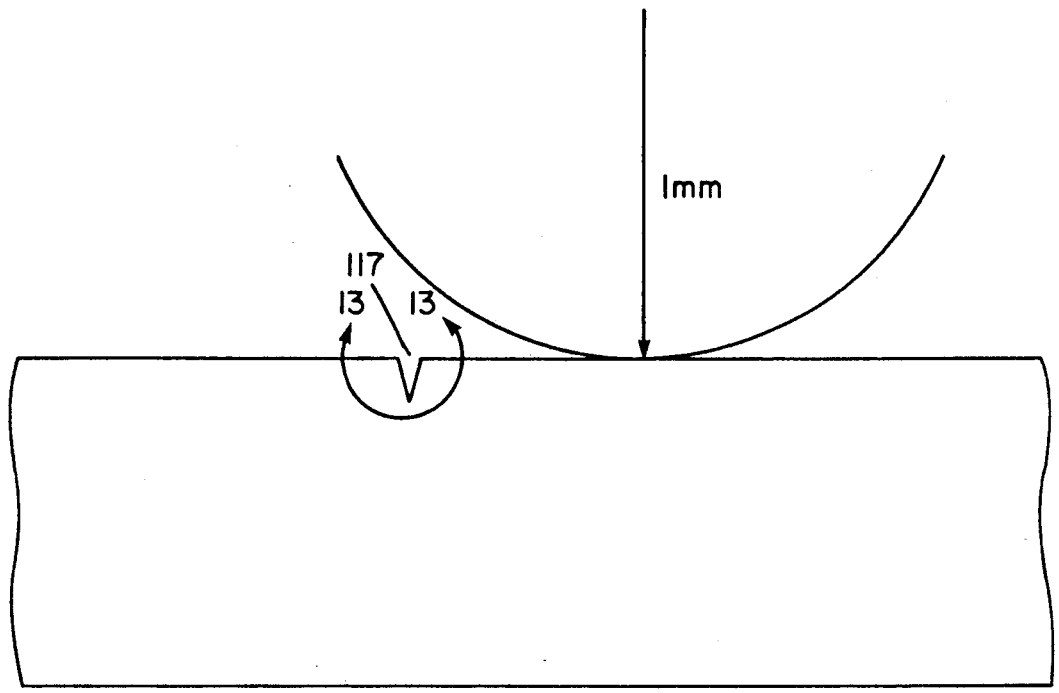
FIG. 12 is a diagrammatical view in cross section of a water droplet incident upon a compressed layer in accordance with a further aspect of the present invention.
Figure 13:
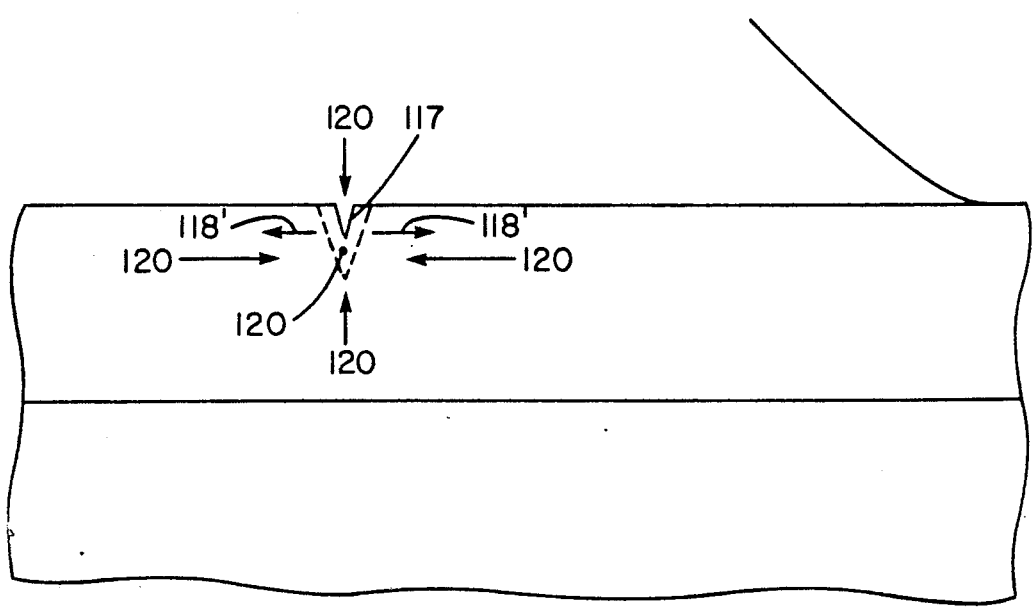
FIG. 13 is an enlarged view of the water droplet impacting the compressed layer as shown in FIG. 12.

Referring now to FIGS. 11 and 12, the mechanism by which the compressive layer 114 strengthens and protects the dome 110 from damage encountered during high velocity water impact or mechanical loading will now be described.

As shown in FIG. 11, a conventionally polished surface 112a has a water droplet 115 having a resultant velocity $V_O$ normal to a surface 112a impinging upon surface 112a of layer 112. Present in surface 112a of layer 112 is a pre-existent microflaw 116 created during fabrication of the polished surface or otherwise associated with the morphology of base 112. During impact of water droplet 115 with conventional surface 112a, a tensile component of the resulting surface stress wave represented by arrows 118 is produced. In response to this tensile force 118 in the region of the microflaw 116, the microflaw propagates as crack 116′. If the tensile force is sufficiently high, the crack 116′ can propagate completely through the base 112 of optical element 10. With a sufficient number of these cracks, the optical transparency of the element can be severely reduced due to internal reflections and refraction in the region of the crack. More importantly, the optical element with sufficient cracks is susceptible to shattering or breaking thus exposing the remainder of the optical system (not shown) to catastrophic damage.

Figure 14B:
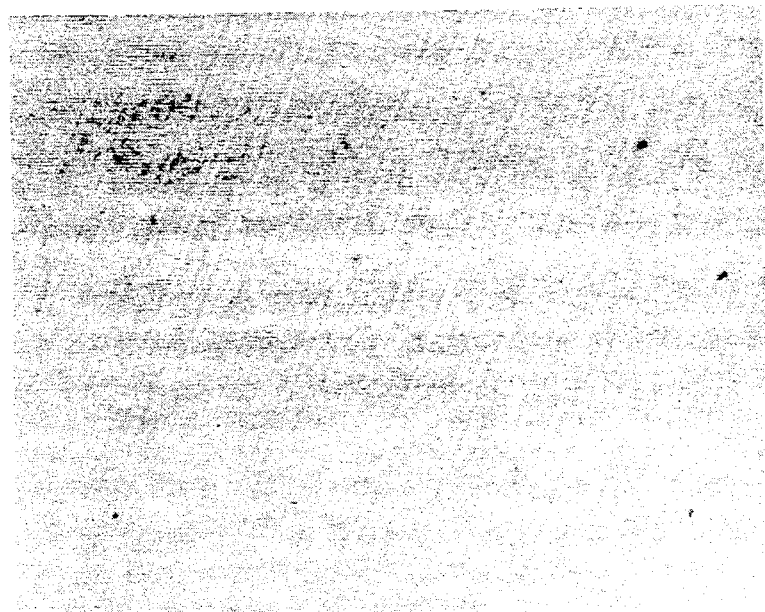
FIGS. 14A, 14B are photomicrographs of a conventionally polished dome surface and a dome surface tempered in accordance with the present invention.
Figure 14A:
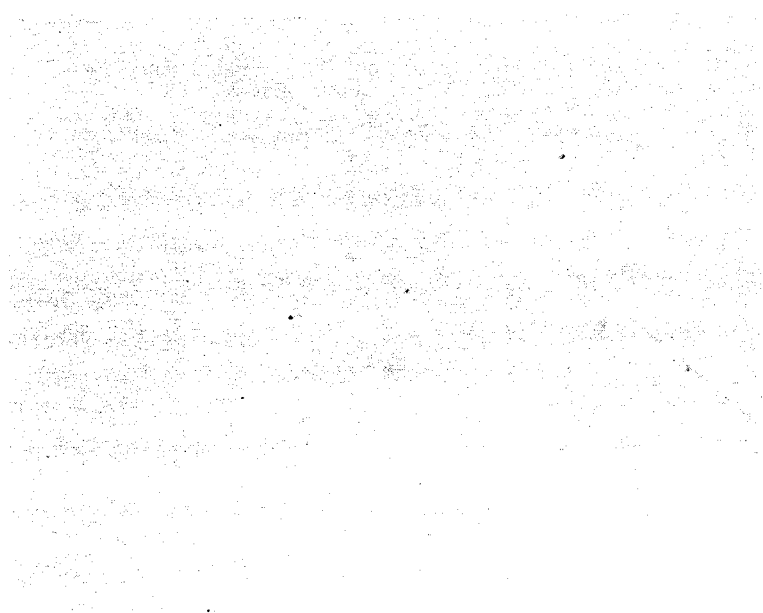
Figure 15:
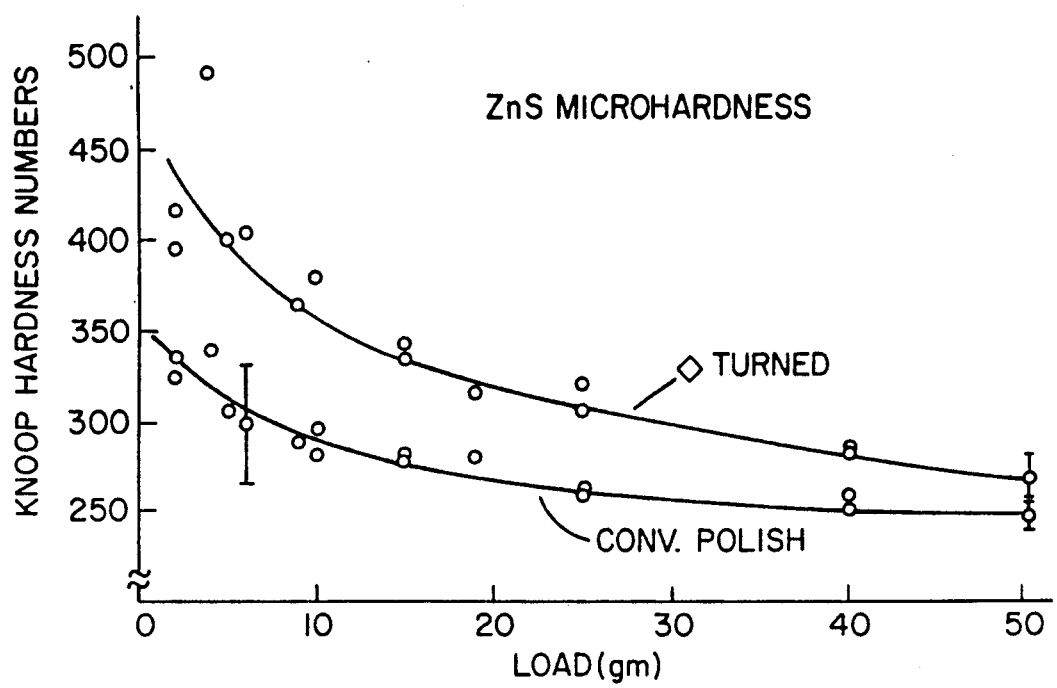
FIG. 15 shows plots of KNOOP hardness numbers as a function of load for a conventional polished ZnS surface and a ZnS tempered disk surface.

As shown in FIGS. 14 and 15 in accordance with the present invention, as compressed layer 114 is provided over the dome 110, the pre-existing microflaws 116 provided in the base 112 are healed by compression of the material in region 114. During fabrication of the compressed layer 114, opposing compressive forces 114 are provided which cause the microflaws to shrink in size resulting in smaller microflaws 117. Furthermore, the material surrounding the microflaw 117 is still under compression as represented by arrows 120 pushing in on the material in region 113b. During water droplet impact, as mentioned above, a tensile stress component 118 is provided at the site of the microflaw 117. Accordingly, since the microflaw 117 is smaller, the velocity at which the water droplet may impact the surface layer without causing damage has increased since the velocity threshold is increased by reducing the size of the microflaw. Furthermore the material remains in compression after the furrows 113 are provided and the reduced tensile force component 118' created at microflaw 117 will not propagate through the compressive layer 113 and into the base layer 112 unless the tensile force component 118' can overcome the compressive force representing the degree to which the layer 114 is under compression. Accordingly, the compressive layer 114 provides two mechanisms to increase the velocity threshold at which impact damage will occur: it generally reduces the extent of the microflaws present in the material thereby creating for a given water droplet impact velocity a smaller resulting tensile component; and provides a compressive force to dampen or reduce the propagation of the tensile force produced through the compressed layer 13.

Figure 10:
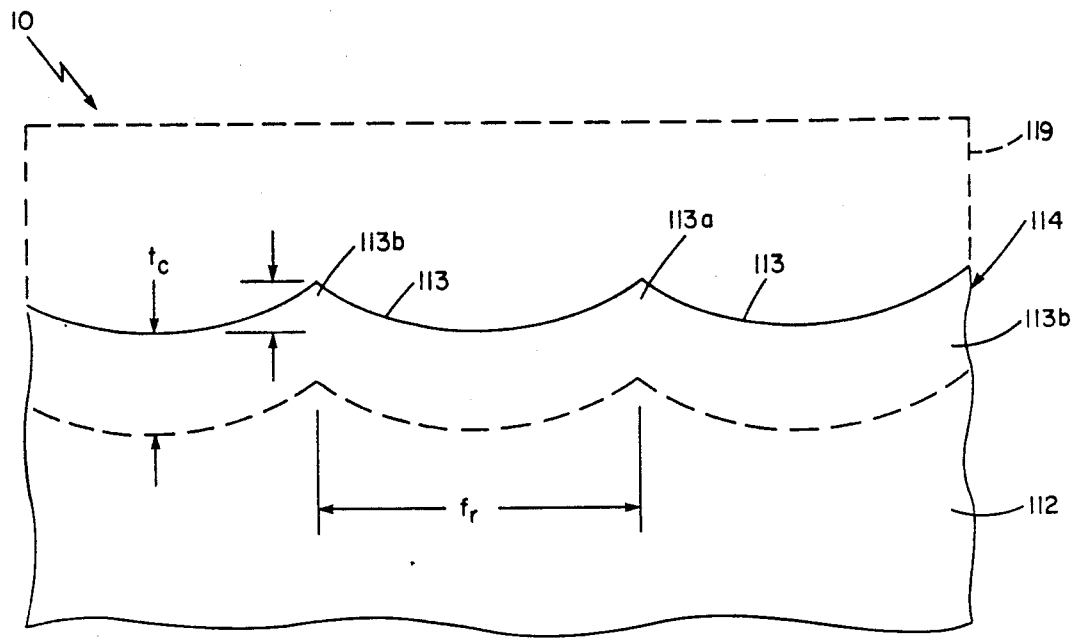
FIG. 10 is a cross-sectional enlarged view of a surface portion of the dome shown in FIG. 11.

The preferred method for providing the compressive layer 114 is to machine a surface portion of the optical element with a single diamond point. Generally, the surface may be machined in two steps. The first step, a "rough cut," has machining parameters selected to remove substantial amounts of material 119 as shown in FIG. 10, this may be on the order of 1 to 5 mils or more of material. The second cut, a "finishing cut," may be of one or several passes or cuts where a small amount of material, typically 0.1 to 0.5 mils is removed to provide a substantially flat, yet furrowed surface.

Typical surface characteristics for the tempered compressive layer 114 shown in FIG. 10 are as follows:

The furrows 113 typically may have a width $w_f$ typically of 0.01 to 0.02 mm. The sidewall portions 113a generally have a height $h_f$ of 10Å to 10,000Å.

Typical machining parameters that are useful to machine a compressive layer 114 in 1 inch zinc sulfide discs are as follows:

Useful Single-Pt Machining
Parameters for Creating
Compressive Surface Layers

Rough Cut

Depth of Cut = 0.003 inch
Rotation Speed = 750 rpm
Feed Rate = 0.5 inches/min.
Tool Radius = 0.125 inches Finish Cut Depth of Cut = 0.0002 inches
Rotation Speed = 550 rpm
Feed Rate = 0.250 inches/min.
Tool Radius = 0.125 inches Sixty samples of zinc sulfide discs were fabricated in accordance with the present techniques. Mechanical parameters measured on these discs were knoop microhardness (Kg/mm$^2$) and fracture strength. Fracture strength was generally at least 19,500 psi which is greater than the fracture strength (15,500) of conventional polished samples. Accordingly, this technique provides about a 25% increase in fracture strength.

As shown in FIGS. 14A, 14B the conventionally polished surface is substantially smooth, uniform and featureless, whereas, the surface prepared in accordance with the present invention has substantially regularly spaced apart furrows or grooves.

Figure 16:
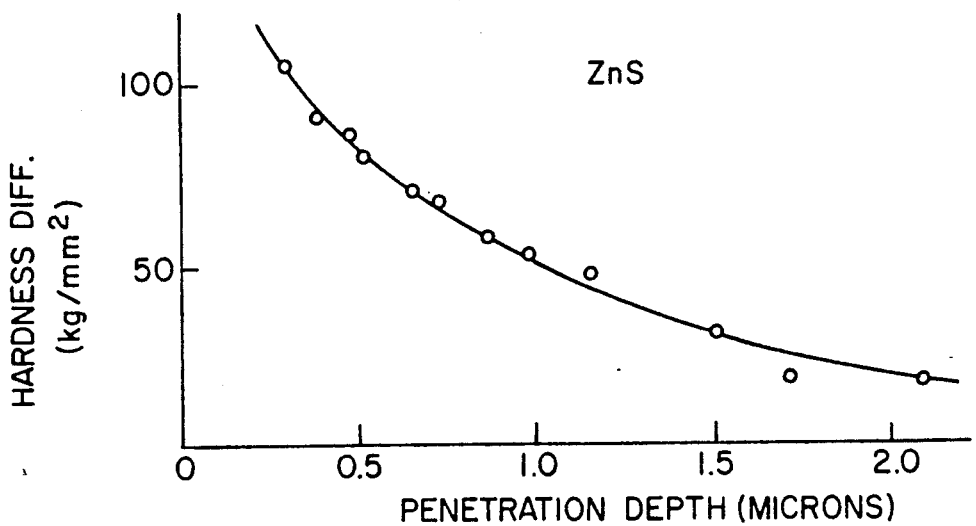
FIG. 16 is a plot of typical hardness difference (KNOOP) as a function of penetration depth into the compressed surface of the ZnS tempered disk.

As shown in FIGS. 15 and 16, typical microhardness plots of knoop hardness numbers vs. load for conventionally polished zinc sulfide discs and zinc sulfide discs having the compressed layer 114 are shown. The knoop hardness for discs having the compressed layer 114 are generally between 50 and 100 numbers higher than the knoop hardness numbers for conventionally polished discs for loads of 30 grams or less. Furthermore, as shown in FIG. 16, the hardness difference expressed as difference in knoop hardness numbers as a function of penetration depth into the compressed layer 114 indicates that a significant increase in hardness is provided for penetration depths of 2 microns or less. By extrapolation of this data, it is inferred that the hardness effect is confined within a 3 micron surface portion of the machined samples.

Figure 17A:
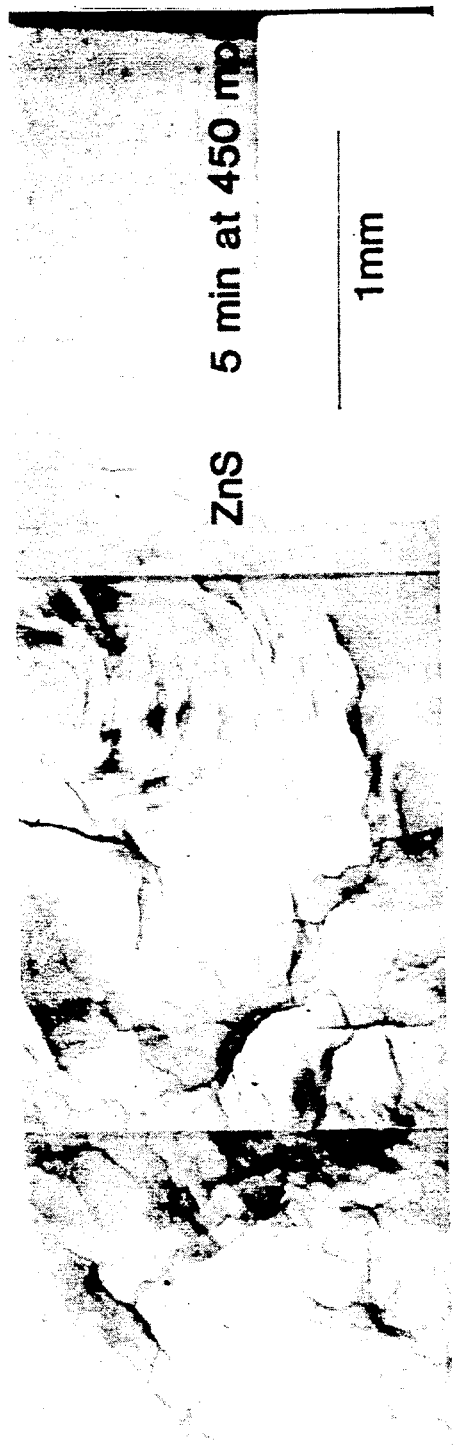
FIGS. 17A, 17B are photomicrographs, respectively, of a surface of a ZnS lens which was conventionally polished and a ZnS lens which was tempered in accordance with the present invention each after exposure to a simulated rain field.
Figure 17B:
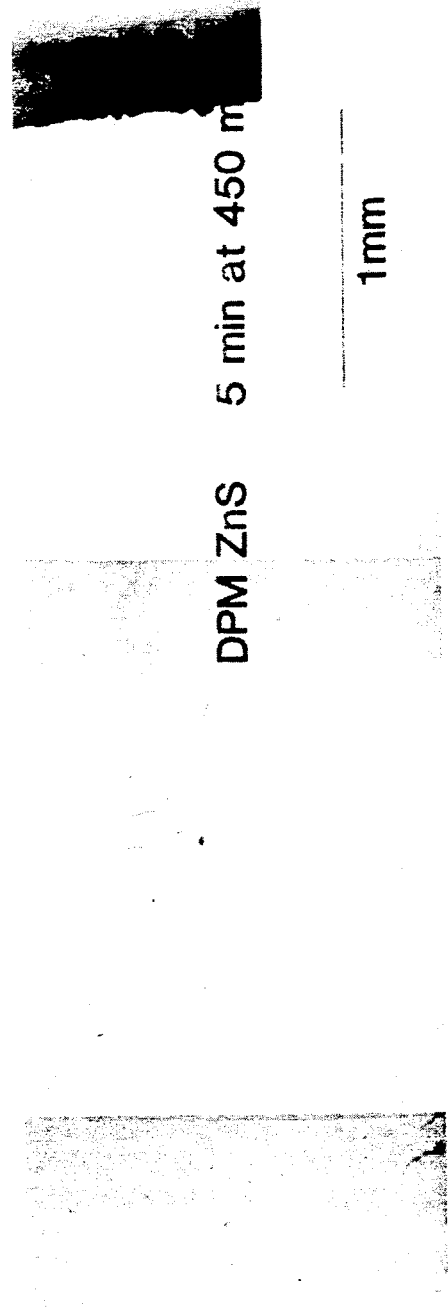

A comparison of FIGS. 17A and 17B, conventionally polished vs. diamond point machined zinc sulfide plates following 5 minutes of exposure at 450 miles per hour to a 1 inch per hour simulated rain field, 2 mm drop diameter, shows that the conventionally polished sample sustained significantly more damage consisting primarily of subsurface fractures; whereas, the damage sustained by the plate having the compressed layer provided by single diamond point machining a zinc sulfide sample (FIG. 17B) is substantially reduced.

Comparison of FIGS. 18A and 18B indicates that layer 13 is a compressed layer of optical material. Two zinc sulfide lens blanks from the same lot of zinc sulfide material were polished. One lens had its surface polished optically flat using conventional polishing techniques, the other lens had its surface machined flat in accordance with the present invention. Following fabrication, each sample was mounted face down on a lapping pad and thinned down from approximately 0.2 inches to 0.01 inches in thickness and to a quarter wavelength flatness in the visible spectrum across the lapped surface. When these samples were released from the lapping pads, some distortion in each sample took place. This distortion is shown in the interference topographs of FIGS. 18A and 18B. As shown in FIG. 18A, the distortion in the conventionally polished sample was minimal resulting in a final irregular surface. However, as shown in FIG. 18B, for the sample having the compressed layer 114 in accordance with the present invention, the distortion was so severe that it could not be measured on the interferometer. Furthermore, once the specimen in FIG. 3 was released from the lapping pad, the sample distorted into a highly concave surface. This distortion is related to the inherent stresses contained in the layers of the lapped sample. Accordingly, it is clear that substantially no compressive stress is provided in the conventionally polished blank (FIG. 18A); whereas, the sample represented in FIG. 18B was provided with a highly compressed layer 114. The radius of the concave surface was optically measured and this radius was used to estimate the amount of compressive stress present at the surface of the machined sample (FIG. 18B). Compressive stress (S) as related to the radius (R) of the curvature of the surface was as follows:

$$S = \frac{Ed^2}{6(1-V)tR}$$

where E is Young Modulus given as $10.8 \times 10^6$ psi; d is the sample thickness estimated to be 0.009 inches; R is the radius (of curvature measured as $129.2 \times 10^{-2}$ m; t is the thickness of the compressed layer, estimated as $1 \times 10^{-6}$ m and V is the Possion's ratio estimated as 0.28. Solution for S provides S=7100 kg/cm$_2$ or $1 \times 10^5$ psi. Accordingly, the strengthening and hardened effects demonstrated in the previous data are clearly the result of the formation of a surface compressive surface layer on the zinc sulfide blanks during the operations described above. Therefore, by proper choice of machining parameters such as the tool speed, tool type, depth of cut, the feed rate, tool angle, etc. the magnitude of the compressive layer provided on the zinc sulfide surface may be selected and, hence, the degree of strengthening/hardening of the zinc sulfide may also be controlled.

Figure 19:
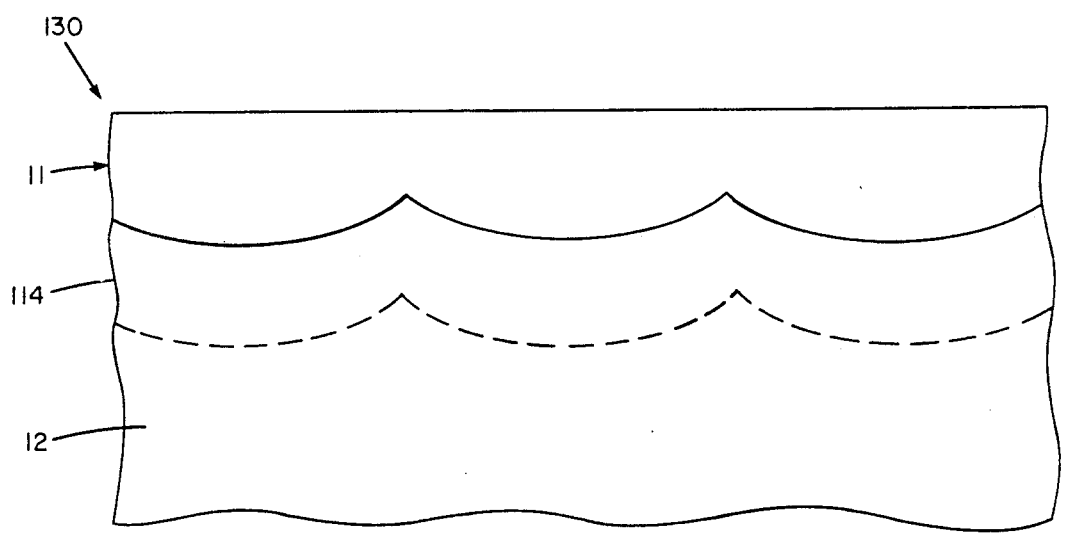
FIG. 19 is a cross-sectional view of a portion of an optical element such as a plate or dome having a compressed layer of optical material and a coating layer in accordance with a further aspect of the present invention.

Referring now to FIG. 19, a portion of an optical element, here a plate 130 is shown to include the layer 12 comprising a material having predetermined optical properties as described above. Disposed over layer 12 is a compressed layer of material 114 as described in conjunction with FIGS. 9-18. Disposed over compressed layer 114 is a coating layer 11 comprising one of the aforementioned single layer or multi-layer coatings described in conjunction with FIGS. 1-8. With this particular arrangement, it is believed that the enhanced hardening and rain erosion resistant properties of both techniques described previously will aid in providing an optical element having substantially improved rain erosion resistance and fracture strength.

Having described preferred embodiments of this invention, it will now be apparent to one of skill in the art that other embodiments incorporating its concept may be used. It is felt, therefore, that this invention should not be limited to the disclosed embodiments, but rather should be limited only by the spirit and scope of the appended claims.

What is claimed is:

1. An optical element comprising:
   a base comprising a first material having an index of refraction at 10 microns in the range of about 2.2 to 3.3, a predetermined optical transmissivity over at least portions of a band of at least about 2 $\mu$m to 30 $\mu$m and a predetermined resistance to damage caused by high velocity water droplet impact;
   means optically transparent over said portion of said band and disposed over said base for increasing the resistance of the base to damage caused by water droplet impact, comprising a second material having an index of refraction less than 2.0 at 10 microns and a physical thickness related to $((2[n]N+1)\lambda/4)/n_c$, when N is an integer, $\lambda$ is a selected wavelength in the band, and $N_c$ is the refractive index of the second material at the wavelength $\lambda$.

2. The optical element as recited in claim 1 wherein said means further comprises a compressed region of said first material disposed on said base, with said second material disposed over said compressed region of first material.

3. The optical element as recited in claim 2 wherein the compressed layer includes a plurality of furrows disposed in a surface portion of said layer having disposed under said furrows a compressed layer of said first material and having disposed between adjacent furrows compressed regions of the first material.

4. The optical element as recited in claim 3 wherein the first material comprises a material selected from the group consisting of zinc sulfide, zinc selenide, gallium arsenide, gallium phosphide, mercury cadmium telluride, cadium telluride and a ternary sulfide having the general chemical formula $MN_2S_4$ where M is a cation selected from the Group 1A elements, N is a cation selected from the lanthanide rare earth series elements, and S is the sulfide anion $S^{2-}$.

5. The optical element as recited in claim 4 wherein the furrows have a depth in the range of 10 A to 10,000 A and have a width generally in the range of 0.01 to 0.02 mm.

6. The optical element as recited in claim 1 wherein said first material has a first predetermined modulus of elasticity and wherein said second material has a second, higher modulus of elasticity than the modulus of elasticity of the first material and is disposed on said base to provide the increased impact resistance to the base.

7. The optical element as recited in claim 6 wherein the modulus of elasticity of the second material is at least twice the modulus of elasticity of the first material.

8. The optical element as recited in claim 7 wherein the first material comprising the base layer is selected from the group consisting of zinc sulfide, zinc selenide, gallium arsenide, gallium phosphide, mercury cadium telluride, and cadium telluride and a ternary sulfide having the general chemical formula $MN_2S_4$ where M is a monovalent cation selected from the Group 1A elements, N is a cation selected from the lanthanide rare earth series elements and S is the sulfide anion $S_{2-}$; and
   wherein the second material is selected from the group consisting of yttrium oxide, scandium oxide, or mixtures of yttrium oxide, scandium oxide and magnesium oxide.

9. The optical element as recited in claim 1 wherein the first material has a first predetermined modulus of elasticity and wherein the means comprises a first layer of the second material disposed on said base said second material having a second, higher modulus of elasticity than the modulus of elasticity of the first material and a second layer of a third material disposed on said first layer having a modulus of elasticity higher than the modulus of elasticity of the first material and the second material, and having an index of refraction greater than 2.0.

10. The optical element as recited in claim 9 wherein the physical thickness of the second layer and third layer is given by $t=(2N+1)\lambda/4/n_c$ where N is an integer 0,1,2,3, ..., $\lambda$ is a particular wavelength of interest and $n_c$ is the index of refraction of the second and third layers.

11. The optical element as recited in claim 9 wherein:
   the base comprises a material selected from the group consisting of zinc sulfide, zinc selenide, gallium arsenide, gallium phosphide, mercury cadmium telluride and cadmium telluride and a ternary sulfide having the general chemical formula $MN_5S_4$ where M is a cation selected from the Group 1A elements, N is a cation selected from the lanthanide rare earth series elements and S is the sulfide anion $S^{2-}$;

wherein the second material is selected from the group consisting of yttrium oxide, scandium oxide, and a mixture of yttrium oxide, scandium oxide and magnesium oxide; and wherein the third material is selected from the group consisting of hard carbon, cerium oxide, titanium oxide and zirconium oxide.

12. The optical element as recited in claim 1 wherein the first material of the base has a first predetermined modulus of elasticity and wherein the means further comprises:

a compressed region of said second material and a layer of a third material having a second, higher modulus of elasticity than the material of the first layer.

13. The optical element as recited in claim 1 wherein said means further comprises:

a compressed region of the first material disposed in the base and a composite layer comprising a layer of said second material layer of a third material disposed on the layer of second material.

14. The optical element as recited in claim 13 wherein the modulus of elasticity of the third material is at least twice that of the material of the base.

15. The optical element as recited in claim 14 wherein the first material is selected from the group consisting of zinc sulfide, zinc selenide, gallium arsenide, gallium phosphide, mercury cadmium telluride, and cadmium telluride and a ternary sulfide having the general chemical formula $MN_2S_4$ when M is a group 1A element N is a lanthanide rare earth element and S is the sulfide anion $S^{2-}$ said second material is selected from the group consisting of yttrium oxide, scandium oxide, magnesium oxide or mixture of yttrium oxide, scandium oxide and magnesium oxide; and said third material is selected from the group consisting of hard carbon cerium oxide, titanium oxide and zirconium oxide.

16. An optical element comprising a base comprising a first material having an index of refraction between about 2.2 and 3.3 at 10 microns, a predetermined optical transmissivity over the range of 8 μm to 12 μm and a predetermined modulus of elasticity;

a layer of a second, different material selected from the group consisting of yttrium oxide, scandium oxide, or homogeneous mixtures of yttrium oxide, scandium oxide and magnesium oxide disposed on said base, transparent over said optical wavelength range and having a modulus of elasticity at least about twice the modulus of the material of the base, an index of refraction less than 2.0 at 10 microns and a physical thickness related to $((2N+1)\lambda/4)/n_c$, where $\lambda$ is a wavelength in the range of 8 λm to 12 λm, and N is an integer, and $n_c$ is the refractive index of the second material at the wavelength λ to protect such element from water droplet impact and to anti-reflect correct the optical element.

17. The optical element as recited in claim 16 wherein the base comprises a material selected from the group consisting of zinc sulfide, zinc selenide, galliuarsenide, gallium phosphide, mercury cadmium telluride, cadmium telluride and a ternary sulfide having the general chemical formula $MN_2S_4$ where M is a monovalent cation from the Group 1A elements, N is a cation selected from the lanthanide rare earth series elements and S is the sulfide anion $S^{2-}$.

18. The optical element as recited in claim 17 wherein the layer of second material is yttrium oxide.

19. An optical element comprising a base comprising a material having an index of refraction between about 2.2 and 3.3 at 10 microns, a predetermined optical transmissivity over a predetermined range of wavelengths, a first predetermined modulus of elasticity; and a composite coating disposed over at least a portion of said base comprising:

(1) a first layer comprising yttrium oxide having a modulus of elasticity of at least twice the modulus of elasticity of said base material and having an index of refraction less than the index of refraction of the material of said base;

(2) a second layer comprising a second high modulus of elasticity material having a modulus of elasticity of at least twice the modulus of elasticity of said base material and having an index of refraction greater than 2.0.

20. The combination as recited in claim 19 wherein:

the base comprises a material selected from the group consisting of zinc sulfide, zinc selenide, gallium arsenide, gallium phosphide, mercury cadmium telluride and cadmium telluride and a ternary sulfide having the general chemical formula $MX_2S_4$ where M is a monovalent ion selected from the Group 1A elements, X is a divalent ion selected from the lanthanide rare earth series elements and S is the sulfide anion $S^{2-}$; and wherein the second high modulus material is selected from the group consisting of hard carbon, cerium oxide, titanium oxide and zirconium oxide.

21. The combination as recited in claim 20 wherein the first layer has a physical thickness t given by $t=((2N+1)\lambda/4)n_{c1}$ where N is an integer 0,1,2,3, ..., is a particular wavelength of interest and $n_{c1}$ is the index of refraction of the material of the first layer; and wherein the physical thickness of the second layer is given by $t=((2N+1)\lambda/4)/n_c$ where $n_{c2}$ is the index of refraction of the material of the second layer.

22. A method of protecting a region of an optical element comprised of a first material having a first modulus of elasticity and a predetermined optical transmissivity over a wavelength range of about 8 μm to 12 μm from impact damage encountered in a high velocity droplet environment comprises the step of:

providing a layer of a second material selected from the group consisting of yttrium oxide and scandium oxide over the region to be protected having a modulus of elasticity at least twice the modulus of elasticity of said first material having a predetermined optical transmissivity over said range and which is resistant to debonding from the first material in response to sheer stress causes by radial outflow during water droplet impact.

23. The method as recited in claim 22 wherein the material comprising the optical element is selected from the group consisting of zinc sulfide, zinc selenide, gallium arsenide, gallium phosphide, mercury cadium telluride and cadmium tellurid.

24. The method as recited in claim 22 further comprising the step of:

providing a layer of a third material over the layer of second material, said third material having a modulus of elasticity at least twice the modulus of elasticity of said first material and an index of refraction greater than the index of refraction of the second material.

25. The method as recited in claim 24 wherein the third material is selected from the group consisting of hard carbon, cerium oxide, titanium oxide and zirconium oxide.

26. A method of bonding a layer of hard carbon to a base comprising a material selected from the group consisting of a Group II-V or Group III-V material comprising the step of:

providing a first layer comprising a material selected from the group consisting of yttrium oxide, scandium oxide and magnesium oxide between the base and the hard carbon layer.

27. The method of claim 26 wherein the Group II-VI material is selected from the group consisting of zinc sulfide, zinc selenide, mercury cadmium telluride, cadmium telluride and the Group III-V material is selected from the group consisting of gallium arsenide and gallium phosphide.

28. The method as recited in claim 27 wherein the first layer is yttrium oxide and the material of the base is selected from the group consisting of zinc selenide and zinc sulfide and wherein the base, the first layer of yttrium, and hard carbon layer provide an optical element having a high percent transmittance over the wavelength range of at least 8 $\mu$ to 12 $\mu$.

29. The method as recited in claim 28 wherein the first layer has a physical thickness (t) related to $t=(2N+1)\lambda/4/n_c$ [$t=(2N+1)/4/n_c$] where $\mu$ is a wavelength of interest, $n_c$ is the refractive index of the material of the first layer at $\lambda$ and N is an integer 0,1,2,3,...

30. An optical element comprising:
a base comprising a material having a predetermined optical transmissivity, with a surface portion of said optical material being in compression, said compressed surface portion having a plurality of furrows disposed in said surface potion having underlying said furrows and disposed between adjacent, ones of said furrows compressed regions of the material of said base.

31. The optical element as recited in claim 30 wherein said base compress a material selected front he group consisting of zinc sulfide, zinc selenide, germanium, gallium arsenide, gallium phosphide, mercury cadmium telluride, cadmium telluride, and a ternary sulfide having the general chemical formula $MN_2S_4$ where M is a monovalent cation selected from the group 1A elements, N is cation selected front he lanthanide rare earth series elements and S is the sulfide anion $S_2-$.

32. The optical element of claim 31 wherein said compressed region of material has a thickness of about three microns.

33. A method of providing a tempered, strengthened surface to an optical element, comprised of a first material having an initial predetermined fracture strength, comprising the step of converting a surface portion of said material into a compressed surface portion layer of said material, to provide said surface portion layer having a high fracture strength than the initial fracture strength of the material, by single point turning the outer surface of the optical element to introduce onto such outer surface the compressed surface portion of said optical element.

34. The method as recited in claim 33 wherein said turning step is accomplished with a single diamond point tool.

35. The method as recited in claim 34 wherein the turning step comprises the steps of first turning the optical element to remove a surface layer portion having a thickness of at least 1 mil from said outer surface; and then turning said optical element to remove a surface portion of at least 0.01 mils thick from said outer surface to provide on said outer surface of said optical element furrows in said surface portion, said furrows spaced by regions of the compressed material.

36. The method of claim 35 wherein said optical element is selected from the group consisting of a dome, a lens, a plate and a window.

37. The method as recited in claim 36 wherein said material of the optical element is selected from the group consisting of zinc sulfide, zinc selenide, mercury cadium telluride, cadium telluride, germanium, gallium arsenide and gallium phosphide.

38. The method as recited in claim 37 wherein said material is selected from the group consisting of zinc selenide and zinc sulfide.

39. An optical element having an antireflection, impact resistant optical coating, comprising:
a base comprised of a material selected from the group consisting of zinc sulfide and zinc selenide said base having a predetermined thickness in the range of about 0.05 inches to 0.5 inches and said selected material having a predetermined percent transmissivity to optical energy having a wavelength in the range of about 2 $\mu$m to 12 $\mu$m;
a coating of a material selected from the group consisting of scandium oxide and yttrium oxide having an optical thickness equal to about a quarter of a wavelength, said wavelength being selected within said wavelength range.

40. The element of claim 39 wherein said wavelength is in the range of 8 to 12 microns.

41. The element of claim 40 where said single quarter wavelength coating is yttrium oxide.

42. An optical element, comprising
a base of optically transmissive material selected from the group consisting of zinc sulfide and zinc selenide having a surface portion of said material being disposed in compression relative to the base portion of the material and a predetermined percent transmission measured through said surface portion over the wavelength range of 2 $\mu$ to 12 microns.

43. The optical element of claim 42 wherein said compressed surface portion of said optical material has a thickness of about three microns.

* * * * *